(No Model.)
C. H. & J. W. WALD.
FRUIT PICKER.
No. 590,923. Patented Sept. 28, 1897.
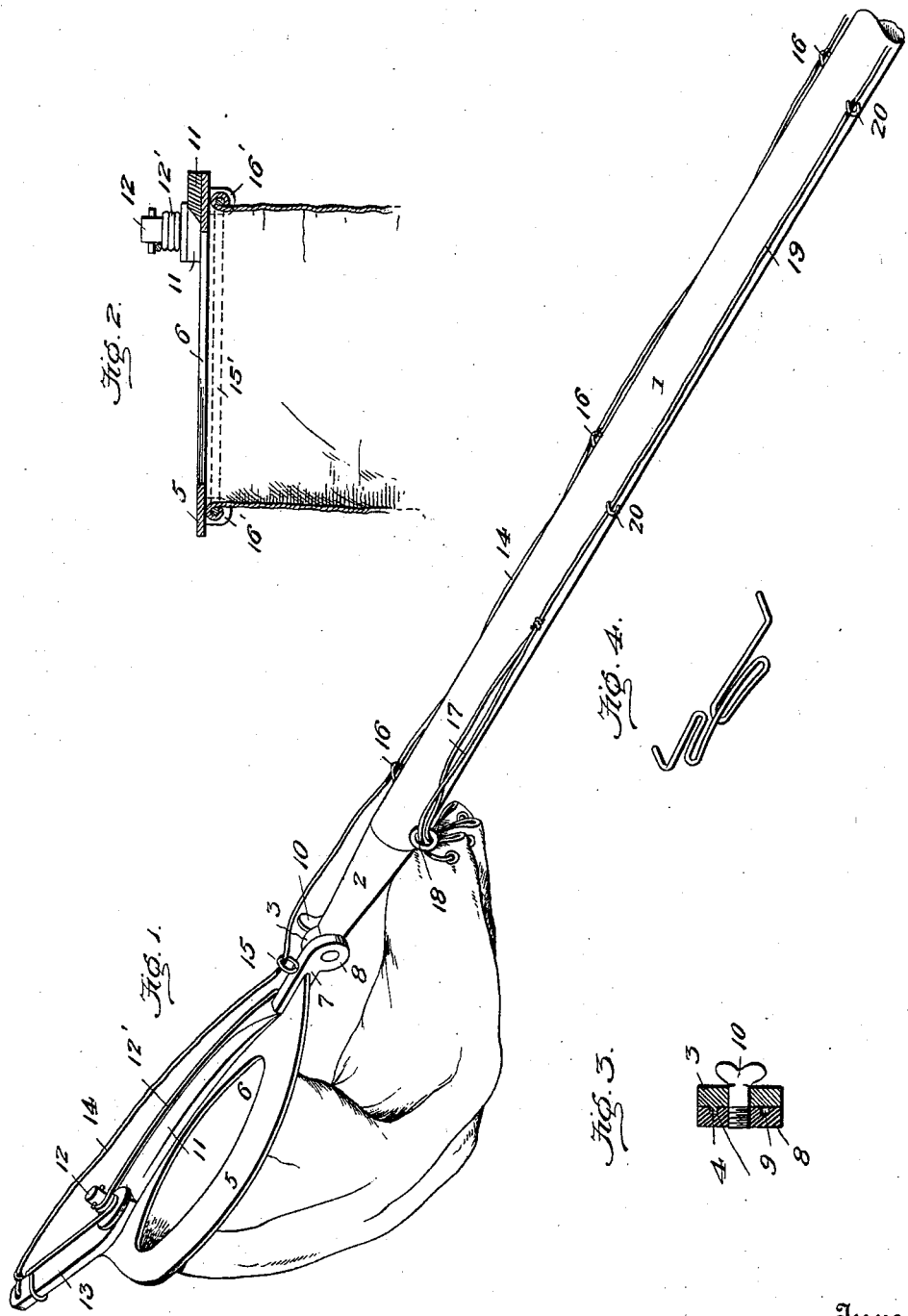
Witnesses
Inventors:
C. H. Wald
and J. W. Wald
By H. B. Willson
Attorney

UNITED STATES PATENT OFFICE.

CHARLES HENRY WALD AND JACOB WILLOUGHBY WALD, OF DALMATIA, PENNSYLVANIA.

FRUIT-PICKER.

SPECIFICATION forming part of Letters Patent No. 590,923, dated September 28, 1897.

Application filed March 10, 1897. Serial No. 626,845. (No model.)

*To all whom it may concern:*

Be it known that we, CHARLES HENRY WALD and JACOB WILLOUGHBY WALD, citizens of the United States, residing at Dalmatia, in the county of Northumberland and State of Pennsylvania, have invented certain new and useful Improvements in Fruit-Pickers; and we do declare the following to be a full, clear, and exact description of the invention, such as will enable others skilled in the art to which it appertains to make and use the same.

Our invention relates to fruit-pickers; and the object is to provide a device of this character which shall be simple of construction, durable in use, and comparatively inexpensive of production, and which has such adjustments as to permit of a person picking fruit in many different positions.

With this object in view the invention consists of certain features of construction and combination of parts, which will be hereinafter fully set forth and claimed.

In the accompanying drawings, Figure 1 is a perspective view of our improved fruit-picker. Fig. 2 is a sectional view through the cutter-frame and chute-frame. Fig. 3 is a transverse sectional view through the joint connecting the cutter-frame and the pole-socket, and Fig. 4 is a detail view of the rope-cleat.

1 denotes a pole of suitable length having secured to its upper end a socket 2, provided with a circular head 3, having a transverse pin 4.

5 denotes the cutter-frame, having a large central aperture 6 and a stud 7, formed with a circular head 8, having a series of annularly-arranged sockets 9, adapted to the transverse pin of the socket-head. A thumb-screw 10 is worked through the openings in these heads and serves to draw the two heads together with the pin of one head into one of the sockets of the other head, thus clamping the cutter-frame to the socket at any desired angle with respect to the pole. A cutter 11 is pivoted upon the post 12, secured to the cutter-frame, and is adapted with its cutting edge to traverse the central aperture of the cutter-head and is provided with a spring 12', coiled about said stud and having one end secured to an end 13 of the cutter and the other end secured to the cutter-frame. The energy of the spring is exerted to retain the cutter at one side of the central opening of the cutter-head. An operating-cord 14 is connected to the end 13 of the cutter and passes down through an eye 15, secured to the cutter-frame, and through a series of eyes 16, secured to the pole. By drawing upon the free end of this cord the knife will be swung across the opening and will sever the stems of the fruit.

15' denotes the chute-frame, which consists of an annular ring supported by perforated studs 16', riveted to the under side of the cutter-frame. This chute has at its lower end a series of eyelets, through which is passed a draw-loop 17, which passes through an eyelet 18, secured to the pole, and is connected to a pole-cord 19, which passes through eyelets 20 on the pole and is adapted to be retained in position by a spring-cleat, around which the cord is wound.

In operation a person standing beneath the tree adjusts the cutter-frame with respect to the pole, so as to reach the fruit. For instance, should it be desired to reach under certain branches and pick fruit at some distance from where the person is standing and which hangs very low the cutter-frame is adjusted to the position shown in Fig. 1. Should, however, it be desired to pick fruit immediately above the person, the cutter-frame is adjusted at right angles to the length of the pole. By this means the person may gather fruit in places heretofore inaccessible.

In operation the cutter-frame is placed with its opening below the fruit and raised upward to allow it to hang within the chute. Then by drawing upon the cutter-actuating cord the cutter will be moved across the opening and will sever the stem of the fruit, allowing it to fall into the chute.

After a certain amount of fruit has been gathered into the chute, by releasing the chute-operating cord from its cleat the weight of the fruit will lower the chute and will allow it to pass out through its lower end into a basket or other receptacle adapted to receive it.

Having thus described our invention, what we claim, and desire to secure by Letters Patent, is—

A fruit-picker having a frame, a knife pivoted on the frame, a pole for supporting the frame, a chute connected to the lower surface of the frame, and open at its lower end, a gathering-cord passing through eyelets in the lower end of the chute, and extending through keepers along the pole to within reach of the operator for closing the end of the chute and holding it up to the pole out of the way, substantially as described.

In testimony whereof we hereunto affix our signatures in presence of two witnesses.

CHARLES HENRY WALD.
JACOB WILLOUGHBY WALD.

Witnesses:
A. S. BUBB,
B. M. BUBB.